United States Patent

[11] 3,549,175

[72] Inventor Bryce B. Evans
 Jackson, Mich.
[21] Appl. No. 781,869
[22] Filed Dec. 6, 1968
[45] Patented Dec. 22, 1970
[73] Assignee Aeroquip Corporation
 Jackson, Mich.

[54] QUICK ACTING FLUID COUPLING
 5 Claims, 4 Drawing Figs.
[52] U.S. Cl. .................................................. 285/1,
 137/614; 285/277
[51] Int. Cl. ..................................................... F16l 27/00
[50] Field of Search........................................ 285/277,
 316, 1, 340(Cursory)

[56] References Cited

UNITED STATES PATENTS
| | | | |
|---|---|---|---|
| 2,473,973 | 6/1949 | Scheiwer....................... | 285/277 |
| 2,565,572 | 8/1951 | Pangborn...................... | 285/316X |
| 2,930,633 | 3/1960 | Ethington et al. ............ | 285/1 |
| 3,140,102 | 7/1964 | Johnson........................ | 285/1X |
| 3,439,943 | 4/1969 | Thomsen....................... | 285/316 |

Primary Examiner—Thomas F. Callaghan
Attorney—Jerry K. Harness

ABSTRACT: A fluid coupling having male and female bodies coupled by releasable detents on the female body. This body is made of inner and outer sections connected by a frustoconical spring washer which may be thrown overcenter to a releasing or a locking position. The outer section is fixed, for example to a tractor frame, and the detents are carried by the inner section. To couple the bodies, the male body is inserted in the inner female body section and the spring is forced overcenter. Disconnection is accomplished by pulling the male and female bodies apart until the spring snaps overcenter again.

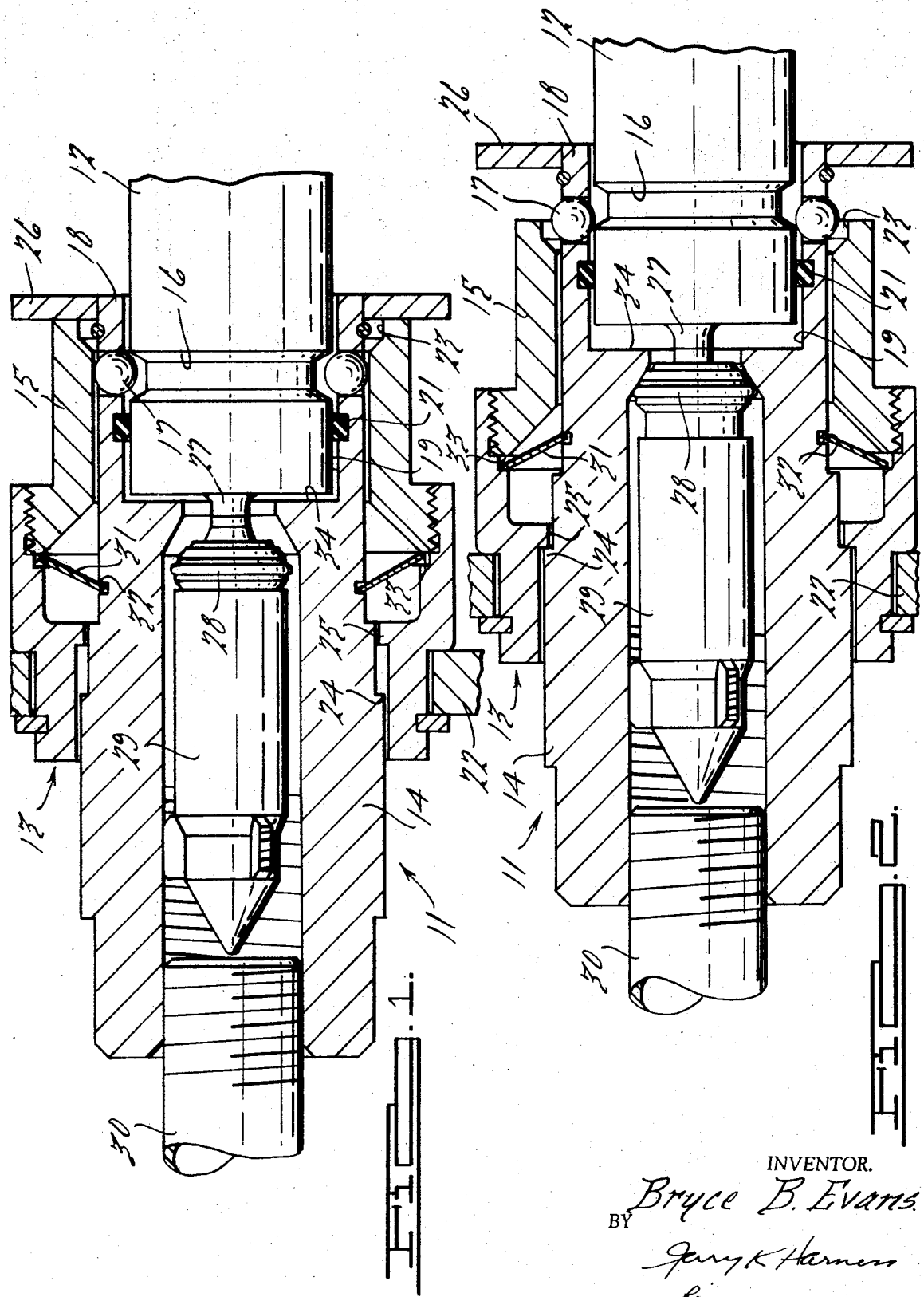

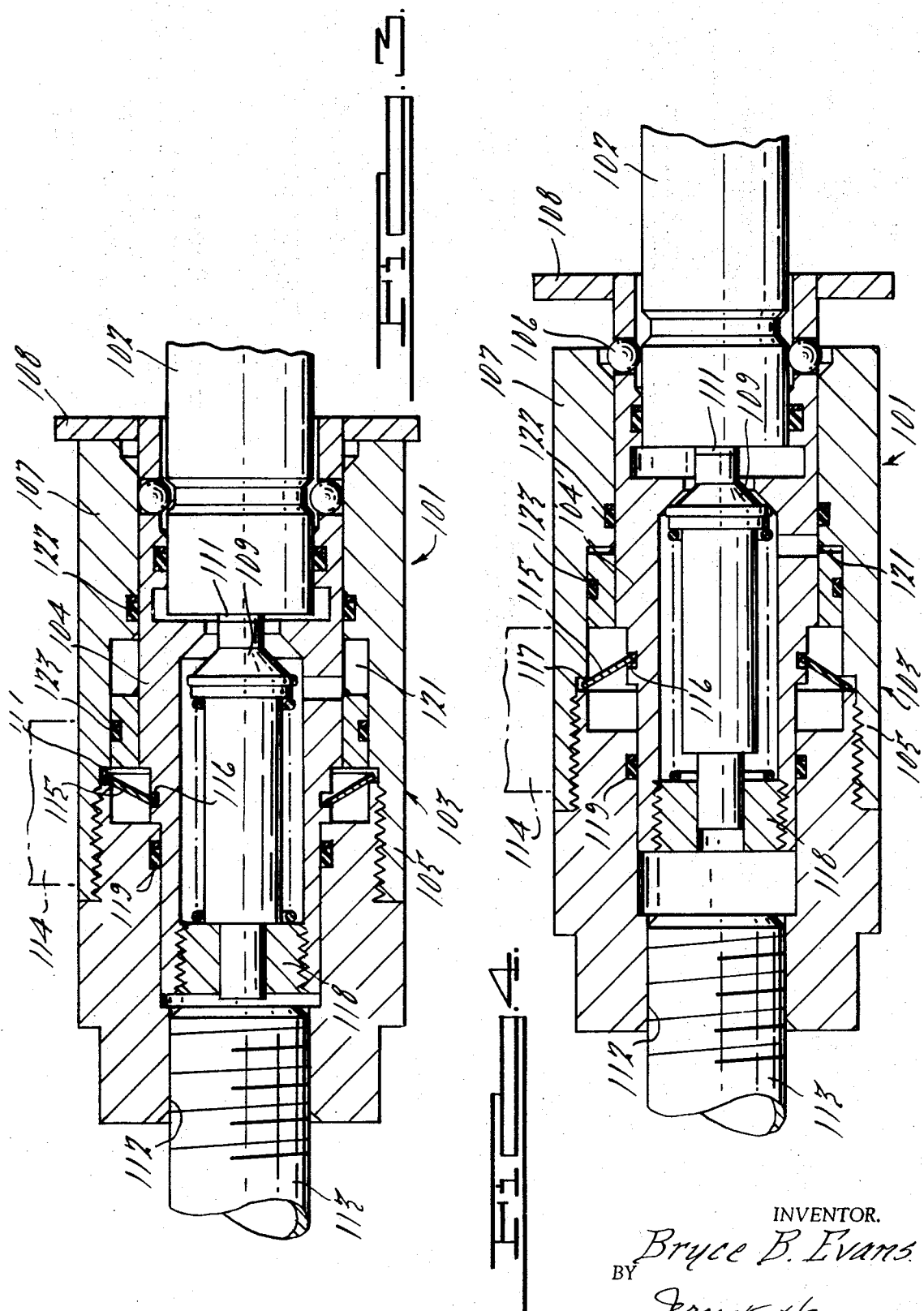

3,549,175

QUICK ACTING FLUID COUPLING

BACKGROUND OF THE INVENTION

1. Field of the Invention

The invention relates to fluid couplings of the type having male and female bodies, the female body carrying radially movable detents which are held in a groove in the male body, after the latter is inserted in the female body, by a sleeve slidable on the female body.

2. Description of the Prior Art

In prior fluid couplings in this type it has been necessary, in order to couple the bodies, to grasp either the female body or the sleeve and urge it in a direction freeing the detents so that the male body may be inserted.

SUMMARY OF THE INVENTION

According to the invention, an annular frustoconical spring is disposed between inner and outer sections of the female body, this spring being shiftable overcenter to either one of two positions. The outer female body section is fixed, for example to a tractor frame, and the female body is connected to a fluid line. The inner section carries the detents and a portion of the outer section acts as a sleeve to hold the detents in locked position. When the bodies are disconnected, the overcenter spring will hold the inner and outer female body sections in a position freeing the detents so that the male body may be inserted in the inner female body section. Thus, an operator may couple the bodies merely by handling the male body, without the necessity of retracting or holding any portion of the female body. When coupled, the overcenter spring will hold the parts in a position so that the sleeve locks the detents in place. Uncoupling may be accomplished by pulling the male body away from the female body, or by pulling the outer female body section away from the male body. The latter may occur, for example when an implement is unhitched from the tractor which continues to move forwardly. In either case, the spring will again snap overcenter, freeing the detents.

BRIEF DESCRIPTION OF THE DRAWINGS

FIG. 1 is a cross-sectional view in elevation of a first embodiment of the invention in which the inner female body section is directly connected to the fluid line, the bodies being shown in coupled position;

FIG. 2 is a view similar to FIG. 1 which shows the bodies in uncoupled position;

FIG. 3 is a view in coupled position in a second embodiment of the invention in which the outer female body section is directly connected to the fluid line, and FIG. 4 is a view of the bodies of FIG. 3 in the uncoupled position.

DESCRIPTION OF THE PREFERRED EMBODIMENTS

Referring first to the embodiment of FIGS. 1 and 2, the coupling is generally indicated at 11 and comprises a male body 12 and a female body generally indicated at 13. The female body consists of an inner section 15 and an outer section 15, the latter acting as a detent locking sleeve as will be later seen.

Male body 12 has a groove 16 to receive a plurality of radially movable spherical detents 17 carried by portion 18 of inner female body section 14. Portion 18 has a cavity 19 for receiving male body 16, this cavity having a seal 21 which engages the male body after it is inserted.

Outer female body section 15 is slidable on portion 18 of inner section 14 and is fixed, for example to the rear frame 22 of a tractor which will normally pull an implement (not shown) to the left in FIGS. 1 and 2. Inner section 14 is movable with respect to outer section 15 between two positions, a detent locking position shown in FIG. 1 and a detent releasing position shown in FIG. 2. In its detent locking position, detents 17 are held in groove 16 by section 15. In the detent releasing position an enlarged bore portion 23 of section 15 is opposite detents 17 which are then free to move radially outwardly so that male body 12 may be connected or disconnected from the female body.

A pair of shoulders 24 and 25 on sections 14 and 15 respectively define the detent releasing position of the parts whereas a shoulder 26 on section 14 engages the end of section 15 to define the locking position. The male and female bodies have fluid retaining valves 27 and 28 respectively which prevent fluid leakage when the bodies are uncoupled but are opened when the parts are coupled. Valve 28 is guided by a sleeve 29 mounted in section 14, for purposes described in my copending application Ser. No. 788,982, filed Nov. 29, 1968, and entitled Fluid Coupling Connectable under High Pressure, said application being assigned to the assignee of the present application. A flexible fluid conduit 30 is connected to inner female body section 14 and passageways (not shown) lead from this connection to the vicinity of valve 28.

The inner and outer sections of the female body are connected by an annular frustoconical spring 31 sometimes referred to as a Belleville washer. The inner edge of this spring is retained in a groove 32 formed on section 14. The outer edge is disposed in a groove 33 formed on the inside of section 15, groove 33 being spaced a considerable distance outwardly from groove 32. Section 15 may be made up of two threadably connected parts, groove 33 being formed at the juncture of the parts in order to facilitate assembly. Spring 31 is adapted to snap overcenter between the position shown in FIG. 1 and the position shown in FIG. 2. In the FIG. 1 position, the spring will hold outer section 15 in its locking position relative to section 14, whereas in its FIG. 2 position the spring will hold the outer section in its detent releasing position with respect to the inner section.

In operation of the embodiment of FIGS. 1 and 2, assume an initial coupled position of the parts as shown in FIG. 1. In order to uncouple the bodies, male body 12 may be pulled to the right with respect to the female body sections. At first, male body 12 will engage detents 17, pulling inner section 14 to the right with respect to fixed outer section 15, spring 31 flexing until it snaps overcenter. The parts will then arrive in the FIG. 2 position in which detents 17 are opposite enlarged bore portion 23 so that the male body is released. The female body sections will be held in their detent releasing os position.

Another way of uncoupling the bodies would be to pull leftwardly on outer female body section 15. This could occur, for example, when a trailer or implement being pulled by the tractor is unhitched, and the tractor continues to move forwardly. Male body 12 being mounted on the implement or trailer will, in effect, be pulled to the right with respect to the female body by this forward movement of the tractor.

Having arrived in the FIG. 2 position, the parts will be ready for recoupling of male body 12. This may be accomplished by insertion of the male body into the inner female body section 18 and pushing the male body to the left so that it engages shoulder 34 at the inner end of cavity 19. Outer female body section 15 being fixed, this movement will cause spring 31 to snap overcenter again to the FIG. 1 position so that the parts will arrive in their locking position. In neither the coupling nor uncoupling operation it will be necessary for the operator to handle any portions of the female body.

FIGS. 3 and 4 illustrate a second embodiment of the invention which is similar to that of FIGS. 1 and 2 but in which the outer female body section is connected to the fluid line. The coupling is generally indicated at 101 and comprises a male body 102 and a female body generally indicated at 103. This female body includes an inner section 104 and an outer section 105. As before, inner section 104 carries radially movable detents 106, and outer section 105 has a portion 107 which acts as a sleeve to lock detents 106 in place when the parts are in the FIG. 3 position. A shoulder 108 on inner section 104 engages the end of outer section 105 to define the locking position of the parts. Inner section 104 also carries a fluid retaining valve 109 engageable with a similar valve 11 in the male body when the parts are coupled, so that both valves are opened.

Outer section 105 has a port 112 to which is connected a fluid conduit 113. This conduit may be of rigid construction, outer section 105 being fixed, for example, to a rear tractor frame member 114. An annular frustoconical spring 115 is disposed between sections 104 and 105. As in the previous embodiment, a groove 116 on section 104 retains the inner edge of spring 115, and a groove 117 on the interior to two-piece section 105 retains the outer edge of the spring.

The fluid from port 112 passes through a radial web member 118 which supports the inner end of valve 109 in the interior of section 104. A seal 119 carried by section 105 engages section 104. A chamber 121 is formed between the two sections, this chamber being defined by a pair of seals 122 and 123 which create a differential pressure area counteracting the pressure exerted by the fluid on section 104 as a result of the presence of seal 119. The purpose and function of these elements of the construction are described in my copending application Ser. No. 777,660, filed Nov. 21, 1968 entitled Quick Acting Fluid Coupling and assigned to the assignee of the present application. Briefly, the purpose of these parts is to permit coupling and uncoupling of the bodies without movement of outer female body section 105, so that fluid line 113 may be rigid.

In operation of the embodiment of FIGS. 3 and 4, assuming an initial coupled position of the parts as shown on FIG. 1, spring 115 will hold the two female body sections in their locking position so that detents 106 lock male body 102 in its coupled position. Uncoupling of the bodies may be accomplished either by forward movement of outer section 107 with respect to male body 102, or rightward pulling of male body 102, as described with respect to the previous embodiment. In either case, inner female body section 104 will be pulled to the right with respect to the outer section, snapping spring 115 overcenter and releasing the detents. Male body 102 may then be withdrawn, and the female body sections will be in readiness for recoupling of the bodies.

I claim:

1. In a quick acting fluid coupling of the type having male and female bodies with radially movable detents on the female body receivable by the male body, inner and outer sections for the female body, the inner section carrying said detents, the outer section being slidable with respect to the inner section between locking and releasing positions, the outer section having a portion holding the detents inwardly when in its locked position but permitting outward movement of the detents when in its releasing position, means forming an annular pocket between said inner and outer female body sections, and an annular frustoconical spring in said pocket connecting said inner and outer female body sections and having an inner edge retained in a groove in said inner body section and an outer edge retained in a groove in said outer body section, said spring being snapped overcenter by relative movement between the inner and outer sections to hold them in either a locking or a releasing position, whereby uncoupling of said male body from the female body will cause said female body sections to assume a position permitting recoupling of the bodies merely by insertion of the male body into the inner female body section without manipulation of either of the female body sections.

2. The combination according to claim 1, further provided with a fluid line connected to said inner female body section.

3. The combination according to claim 1, further provided with a fluid line connected to said outer female body section.

4. The combination according to claim 1, said outer body section being formed of two threadably connected parts, said second groove being adjacent said threaded connection.

5. The combination according to claim 1, further provided with shoulders on said inner and outer female body sections defining the locking and releasing positions of said sections.